(12) United States Patent
Morand et al.

(10) Patent No.: US 10,965,930 B2
(45) Date of Patent: Mar. 30, 2021

(54) GRAPHICAL USER INTERFACE FOR INDICATING OFF-SCREEN POINTS OF INTEREST

(71) Applicant: Schneider Electric Industries SAS, Rueil Malmaison (FR)

(72) Inventors: Denis Morand, Châteauneuf-Villevieille (FR); Patrick Perea, Montbonnot (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 16/744,696

(22) Filed: Jan. 16, 2020

(65) Prior Publication Data

US 2020/0244943 A1    Jul. 30, 2020

(30) Foreign Application Priority Data

Jan. 30, 2019  (EP) .................................... 19305112

(51) Int. Cl.
*H04N 13/183*     (2018.01)
*H04N 13/178*     (2018.01)
*G06K 9/32*       (2006.01)

(52) U.S. Cl.
CPC ......... *H04N 13/183* (2018.05); *G06K 9/3233* (2013.01); *H04N 13/178* (2018.05)

(58) Field of Classification Search
USPC ........................................................ 348/43
See application file for complete search history.

(56) References Cited

U.S. PATENT DOCUMENTS

| 10,649,526 B1* | 5/2020 | Braga Lourenco ..... G06F 3/013 |
| 10,816,939 B1* | 10/2020 | Coleman ................. G06T 15/50 |
| 2012/0075343 A1* | 3/2012 | Chen ......................... G06T 7/73 345/633 |
| 2014/0375683 A1 | 12/2014 | Salter et al. |
| 2015/0325054 A1* | 11/2015 | Salter ................. G02B 27/0172 345/633 |
| 2017/0069143 A1* | 3/2017 | Salter ...................... G06F 3/167 |
| 2017/0105052 A1* | 4/2017 | Defaria ............. H04N 21/2225 |
| 2019/0179406 A1* | 6/2019 | Manda .................... G06F 3/011 |

(Continued)

OTHER PUBLICATIONS

Extended European Search Report for European Patent Application No. 19305112.5 dated Aug. 23, 2019, 9 pages.

(Continued)

*Primary Examiner* — Behrooz M Senfi
(74) *Attorney, Agent, or Firm* — Locke Lord LLP (57) ABSTRACT

A method of displaying an Augmented Reality, AR, Graphical User Interface, GUI, on a device. The method comprises detecting PoIs that are located off-screen based on visual data acquired by the camera and on information related to locations of PoIs. Then, for each detected off-screen PoI, a zone of a predetermined shape and centered on the Poi is determined, the zone being at least partly located on-screen. On-screen apexes corresponding to intersections of edges of the respective zones are determined and a continuous curve is determined based on the on-screen apexes. A GUI is displayed by superimposing the visual data and the continuous curve, wherein the operations are performed in real time during acquisition of the visual data.

9 Claims, 8 Drawing Sheets

(56) References Cited

U.S. PATENT DOCUMENTS

2019/0179509 A1* 6/2019 Daie ............... G06F 3/0485
2019/0317974 A1* 10/2019 Chamberlin ............ G06F 16/58

OTHER PUBLICATIONS

Baudisch, P., et al., "Halo: a Technique for Visualizing Off-Screen Locations", Ft. Lauderdale, Florida, USA, Apr. 5-10, 2003, Paper/Demos: Interaction Techniques for Constrained Displays, vol. No. 5, Issue No. 1, pp. 481-488.
Goncalves, T., et al., "Evaluation of HaloDot: Visualization of Relevance of Off-Screen Objects with over Cluttering Prevention on Mobile Devices", International Federation for Information Processing 2011, pp. 300-308.

* cited by examiner

GRAPHICAL USER INTERFACE FOR INDICATING OFF-SCREEN POINTS OF INTEREST

The present invention concerns enhancement of human machine interactions, in particular, while not exclusively, in the context of the detection of Points of Interest, PoIs, using a handheld device providing Augmented Reality.

Augmented Reality, AR, consists in an interactive experience of a real-world environment where objects, such as Points of Interest, PoI, that reside in the real-world are augmented by computer-generated perceptual information, sometimes across multiple sensory modalities, including visual, auditory, haptic, somatosensory and olfactory. In what follows, the context of augmented reality using visual information is considered.

In the industrial context of an operator engaging an industrial machine with an augmented reality device, e.g. for maintenance, the user walks around the machine, stands at various distances and at different angles, and looks for clues on PoI's. This requires that the user can easily detect the PoIs and to be dynamically guided towards the PoIs.

This creates the problem of not only how to show location information on PoIs, but also how to adapt a Graphical User Interface, GUI, of the device to reflect changes due to the interaction of the device handled by the user and the machine for which PoIs are to be shown.

Handheld devices have screens with a limited size and it is preferable to display information in a relatively large scale (e.g. zoom in) to be readable by the user. However, the display area of the screen may then be too small to show a complete zone of interest, and some points of interest may be located outside of the display area.

Figure 1A:
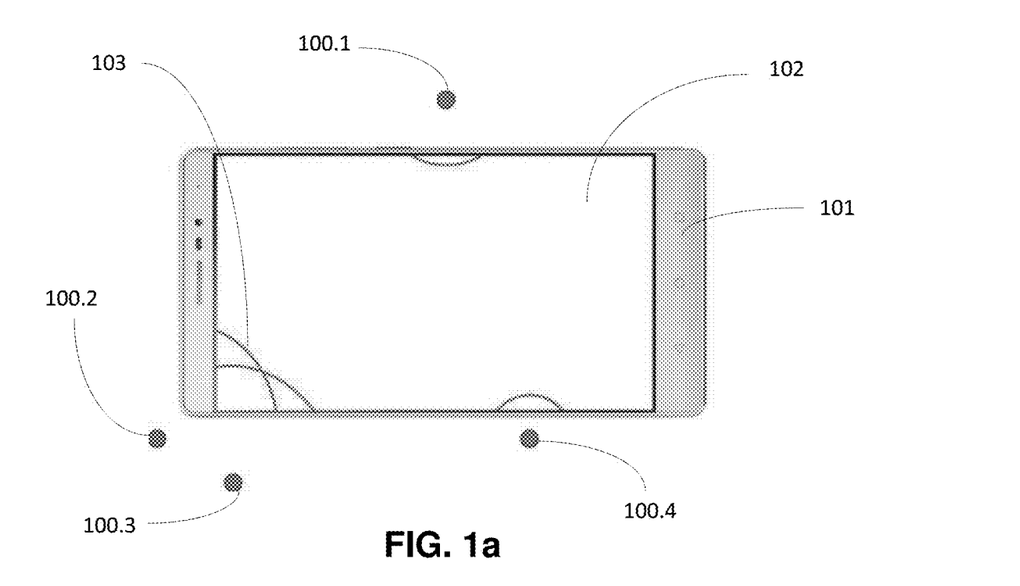
FIG. 1a to 1e represent GUIs according to the prior art.

As illustrated in FIG. 1a, a first solution according to the prior art proposes to display on-screen portions of circles respectively centered on off-screen PoIs.

Several PoIs 100.1 to 100.4 are located off-screen. This means that the PoIs are outside of the field of view of a camera of a device 101.

The device further comprises a screen 102 on which a first GUI is displayed 103. As shown on FIG. 1a, the GUI 103 represents the off-screen PoIs 100.1-100.4 using on-screen portions of circles respectively centered on the respective PoIs 100.1-100.4. However, for high densities of PoIs, portions of circles are overlapping such that the information regarding off-screen PoIs is hardly understandable for the user. The user then needs to make assumptions as to where the PoIs are located which turns detection into a long, annoying and cumbersome experience.

Figure 1B:
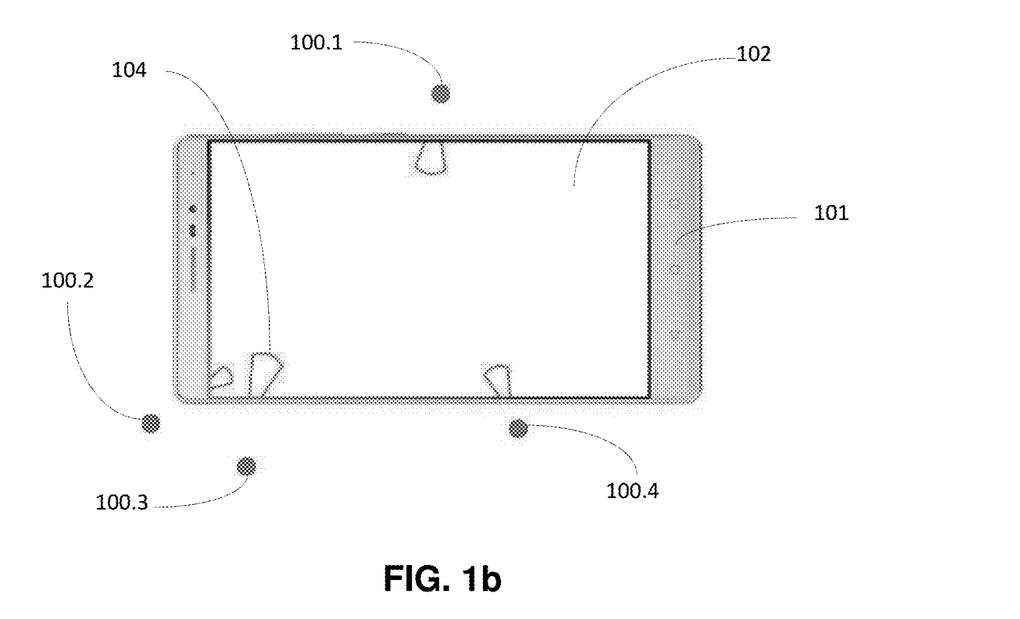

A second solution according to the prior art, shown in FIG. 1b, is similar to the first solution but displays a GUI 104 comprising triangular portions of circles instead. Though this does reduce the overlap, it does not completely eliminate it. In particular, in a situation where the density of PoIs is high, overlaps may still occur, and the same drawbacks as of the first solution are therefore not eliminated in every situation.

Figure 1C:
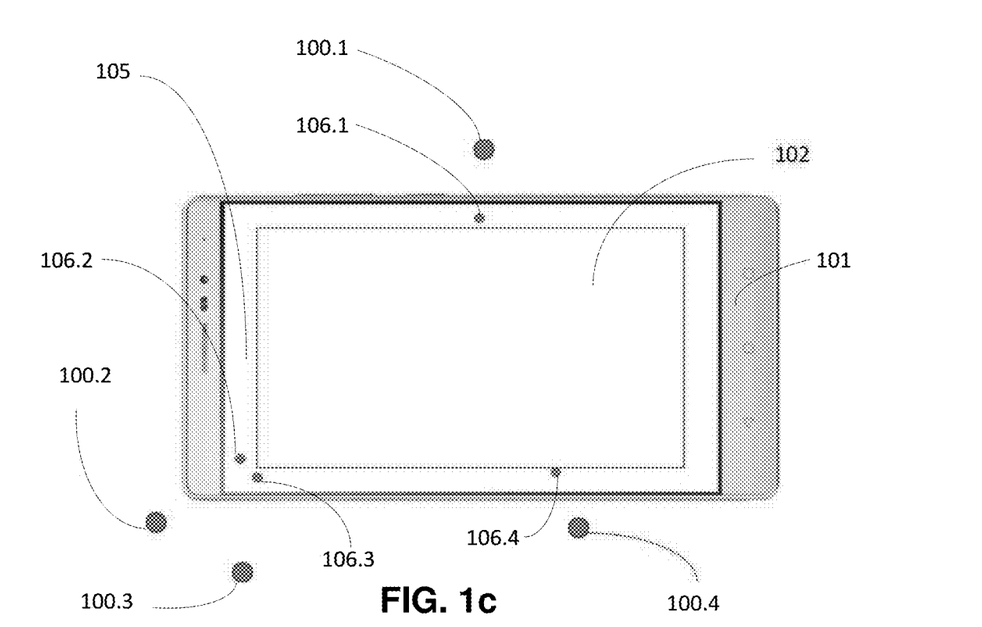

A third solution according to the prior art is illustrated in FIG. 1c. A GUI 105 comprising a zone representing the off-screen area is displayed on the edge of the screen. Off-screen PoIs are represented as respective points 106.1-106.4 in the zone. However, in case of high density, the zone may be overloaded with points such that the off-screen information is hardly understandable by the user. The drawbacks of the two first solutions are therefore not overcome.

These first three prior art solutions therefore rely on off-screen visualization systems without PoI aggregation.

Further solutions propose to aggregate off-screen PoIs.

For example, a fourth solution according to the prior art proposes an off-screen visualization on a device screen with an aggregation of PoIs. The fourth solution is illustrated with reference to FIG. 1d.

Figure 1D:
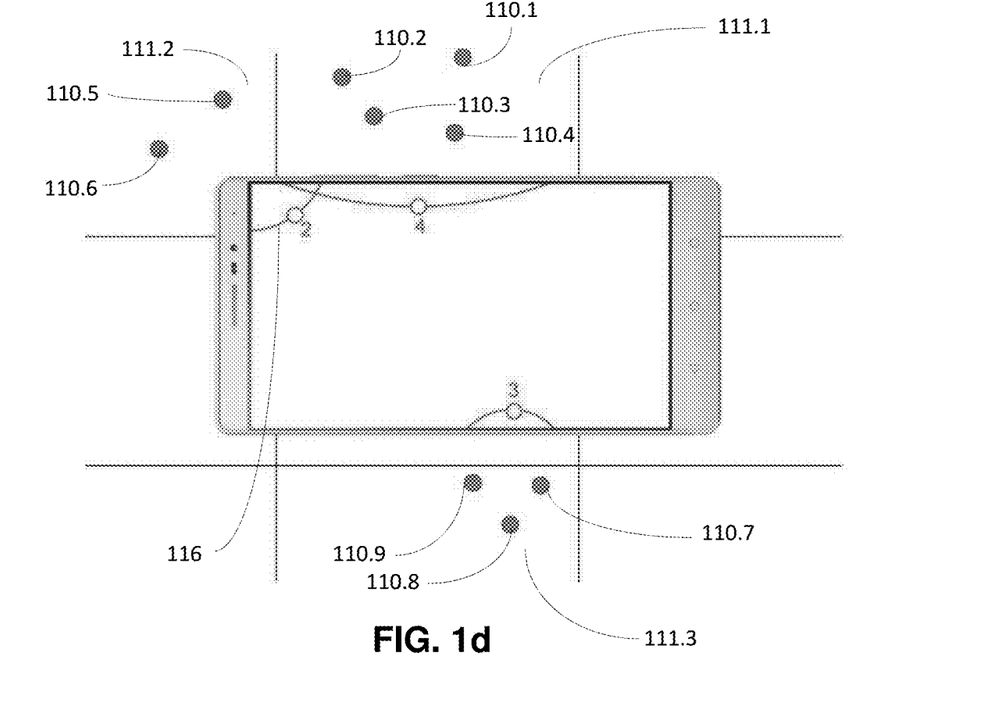

According to this fourth solution, the real space that is off-screen is divided in cells, and PoIs located in the same cell are aggregated.

For example, a first cell 111.1 comprises off-screen PoIs 110.1-110.4, a second cell 111.2 comprises off-screen PoIs 110.5 and 110.6, and a third cell 111.3 comprising PoIs, 110.7, 110.8 and 110.9.

A circular arc as part of a circle corresponding to each cell is then displayed as GUI 116 with an indication of the number of PoIs that the cell comprises. However, this does not provide an indication as to where the PoIs are located within a given cell. Also, as the cells 111 are fixed, two PoIs may be located very near to each other but located in different cells, and in that case, this fourth solution gives a distorted view of the situation. Thus, the fourth solution lacks accuracy and hampers accurate manipulation by a user who walks around a machine comprising PoIs.

Figure 1E:
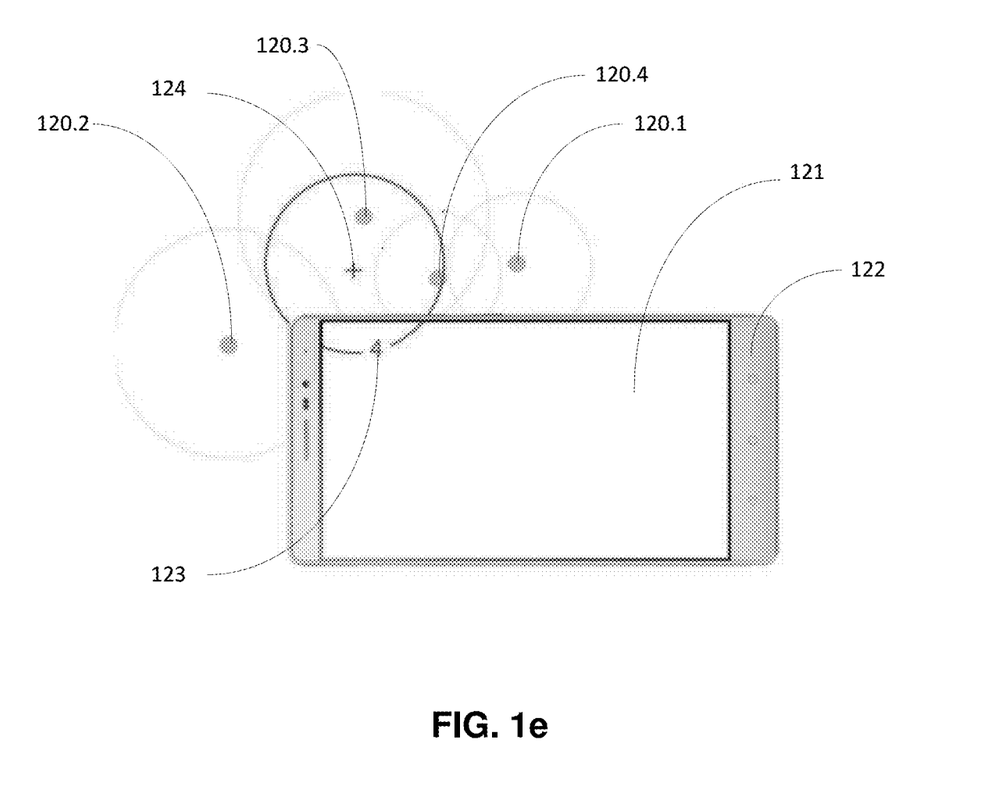

A fifth solution of the prior art is illustrated referring to FIG. 1e. A centroid 124 of a cluster of PoIs 120.1-120.4 that are located outside a screen 121 of a device 122 is determined and a GUI 123 comprising the on-screen portion of a circle having the centroid as its' center is displayed. This solves the problem of overlapping in case of a high density of PoIs. However, just as in the fourth solution, there is information missing regarding the locations of PoIs within a cluster. That means that location information is buried underneath/within the aggregated marker, a circular arc.

The prior art solutions may still be improved by enabling to display a GUI hinting on the location of off-screen PoIs in an aggregated manner, while retaining the information with regard to interdistances of PoIs. In particular, there is a need for an aggregated marker that allows a more variable representation of PoIs in dependence of the number of PoIs to display and their respective locations. The prior art with circles of either cell or centroid only allows increasing or decreasing the curvature of the circular arch or creating overlapping circles.

A first aspect of the invention concerns a method of displaying an Augmented Reality, AR, Graphical User Interface, GUI, on a device, the device accessing information related to locations of Points of Interest, PoIs, comprising the following operations:
  acquiring visual data by a camera of said device;
  detecting PoIs that are located off-screen based on the visual data acquired by the camera and the information related to locations of PoIs;
  for each detected off-screen PoI, determining a zone of a predetermined shape centered on the PoI, said zone being at least partly located on-screen;
  determining on-screen apexes corresponding to intersections of edges of the respective zones;
  determining a continuous curve based on the on-screen apexes;
  displaying a GUI by superimposing the visual data and the continuous curve, wherein the operations are performed in real time during acquisition of the visual data.

This allows a more variable representation of PoIs in dependence of the number of PoIs to display and their respective locations as the continuous curve is both representative of the number of off-screen PoIs and of their respective locations.

According to some embodiments, indexes i can be attributed to apexes in a consecutive manner, i varying between 1 and n, n being the number of apexes; each apex of index i can be associated with a given position and a slope determined based on the union;

wherein for each index i, starting with i=1, the method can further comprise:

determining a quadratic curve based on the positions of the apexes of index i, i+1 and i+2 and based on the slope of the apexes of index i and i+2;

joining the apexes of indexes i and i+1 based on the quadratic curve to obtain a portion of curve;

aggregating the portions of curve to obtain the continuous curve.

The continuous curve obtained by aggregating the quadratic curves gives hints regarding interdistances between the PoIs. Indeed, if the transition between two consecutive quadratic curves at a given apex is smooth, this means that the two PoIs corresponding to the curves are distant from the other PoIs, whereas if the transition is abrupt, it means that the PoIs are close.

According to some embodiments, the method can further comprise:

acquiring new visual data by the camera of the device;

updating the continuous curve based on new visual data; and updating the GUI by superimposing the updated continuous curve and the new visual data.

The continuous curve adapts smoothly in accordance with the dynamic handling of an AR device by an operator. In particular, a manner of dynamically adapting the way in which a marker (the continuous curve) is displayed in order to reflect distance to off-screen PoIs while navigating towards or away from multiple off-screen PoIs on a display may be enhanced. In this context, "smoothly" refers to reducing abrupt transitions in the manner of adapting markers being displayed, and "dynamic" refers to allowing more variety in the presentation of markers.

According to some embodiments, the on-screen apexes may further comprise intersections between the screen and a union of the zones.

According to some embodiments, a size of each zone may depend on a distance between the PoI and the screen or between the PoI and the device.

This enables to ensure that the intersection between the zone and the screen is not null, and that, therefore, the displayed GUI depends on all the PoIs, even the ones that are the more distant from the screen.

In complement, the distance between a given PoI and the screen is a distance between the given PoI and the nearest edge of a rectangle inside the screen, and the zone may be circular and the radius of the circle may be equal to the distance.

This enables to limit intrusion of the continuous curve in the screen, as it never penetrates the rectangle.

According to some embodiments, the GUI may further comprise a numerical information representative of the number of off-screen PoIs corresponding to the continuous curve.

This enables to facilitate manipulation of the AR device by the user. If the GUI comprises several continuous curves in different directions, the GUI may comprise one piece of numerical information for each continuous curve.

A second aspect of the invention concerns a non-transitory computer readable storage medium, with a computer program stored thereon, the computer program comprising instructions for, when executed by a processor, carrying out the steps of a method according to the first aspect of the invention.

A third aspect of the invention concerns a device comprising a screen configured for displaying an Augmented Reality, AR, Graphical User Interface, GUI, the device being configured for accessing to information related to the locations of Points of Interest, PoIs, the device further comprising:

a camera configured for acquiring visual data;

a processor configured for detecting PoIs that are located off-screen based on the visual data acquired by the camera and the information related to the locations of PoIs;

for each detected off-screen PoI, determining a zone of a predetermined shape centered on the PoI, said zone being at least partly located on-screen;

determining on-screen apexes corresponding to intersections of edges of the respective zones;

determining a continuous curve based on the on-screen apexes;

displaying a GUI on the screen by superimposing the visual data and the continuous curve, wherein the operations are performed in real time during acquisition of the visual data.

Further objects, aspects, effects and details of the invention are described in the following detailed description of a number of exemplary embodiments, with reference to the drawings.

BRIEF DESCRIPTION OF DRAWINGS

By way of example only, the embodiments of the present disclosure will be described with reference to the accompanying drawings, wherein.

DETAILED DESCRIPTION

FIGS. 2a to 2g show the Graphical User Interface, GUI, according to some embodiments of the invention.

Figure 2A:
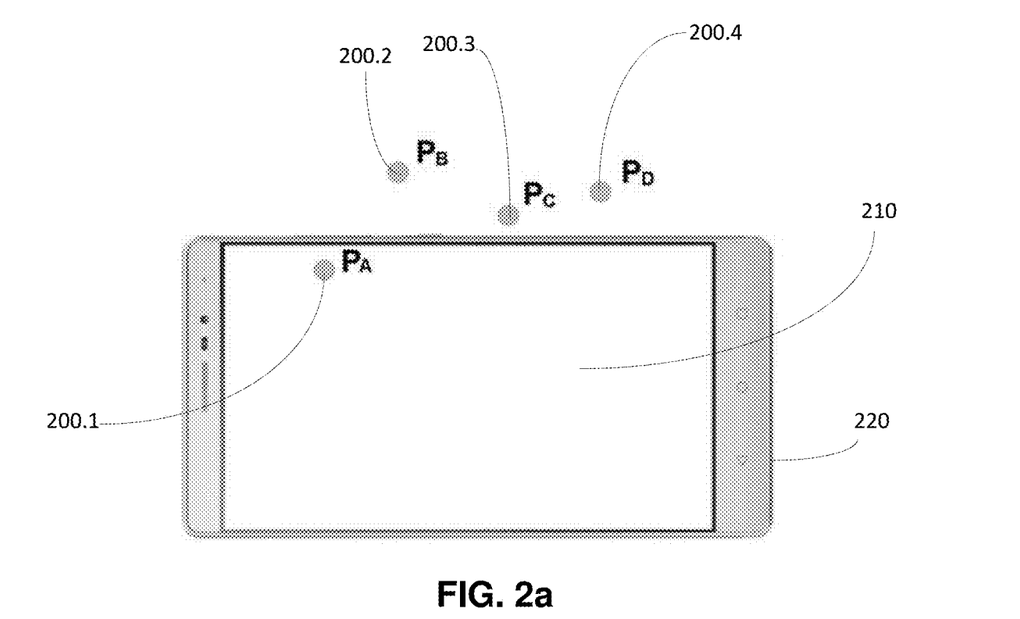
FIGS. 2a to 2g show GUIs according to some embodiments of the invention.

As shown on FIG. 2a, four PoIs 200.1, 200.2, 200.3 and 200.4 are identified and located relatively to a device 220, in particular to a screen 210 of the device 220.

The PoI 200.1 is located on-screen whereas the PoIs 200.2, 200.3 and 200.4 are located off-screen. As explained, the present invention aims at improving the GUI that is displayed to hint on the location of off-screen PoIs in an aggregated manner, while retaining the information with regard to interdistances of PoIs and while being dependent on the number of PoIs, their respective distances thereby enabling accurate manipulations of the device by the user.

Figure 2B:
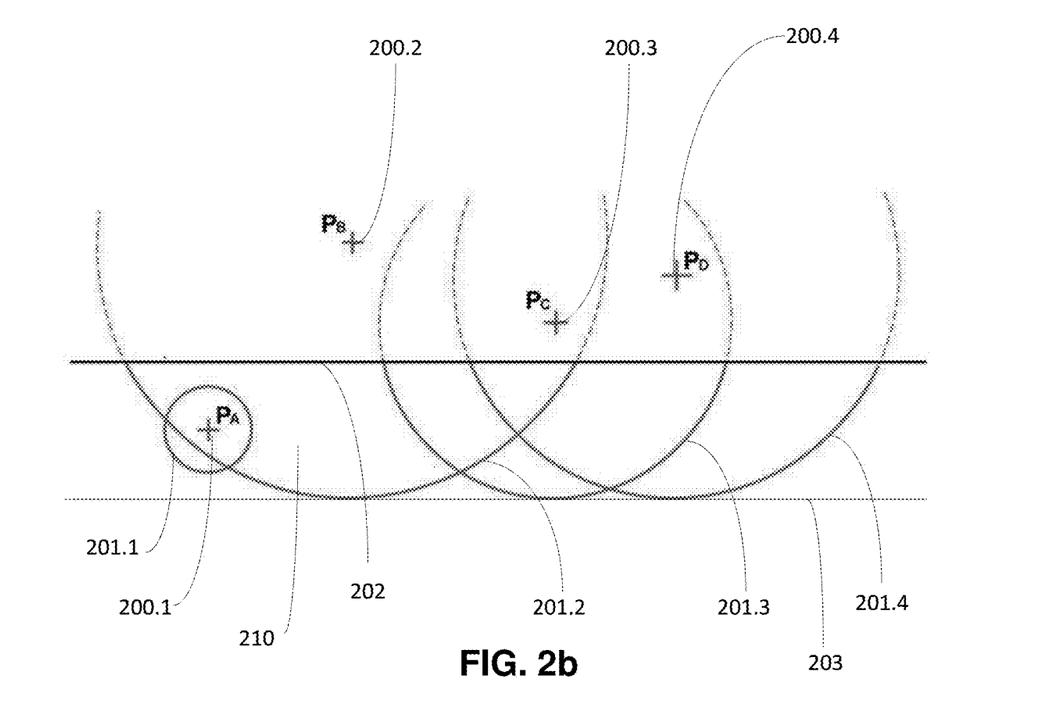

Referring now to FIG. 2b, the edge of the screen 210 that is the closest to the off-screen PoIs 200.2, 200.3 and 200.4 is referenced 202.

According to the invention, zones of a predetermined shape and centered around the PoIs are calculated, said zone being at least partly located on-screen. For example, as shown on FIG. 2a, the predetermined shape may be a circle. Zones are referenced 201.2, 201.3 and 201.4, corresponding respectively to the PoIs 200.2, 200.3 and 200.4.

The size of each zone is such that at least a part of the zone is located on-screen. In case of a circular zone, this means that the radius of the zone is greater than the distance between the off-screen PoI and the edge 202 of the screen 210. For example, the radius of a zone may be equal to the distance between the PoI corresponding to the zone, and a line 203. The line 203 may be one side (the closest from the PoIs 200.2 to 200.4) among four sides of a rectangle (referenced 209 on FIG. 2g) located inside of the screen 210, and the zone of the screen being outside of the rectangle may be dedicated to display of information regarding the off-screen PoIs. As it will be better understood in the following description, predefining a rectangle inside the screen, within which the zones are not entering, enables to limit the intrusion of a curve in the screen.

A circular zone 201.1 is also represented around the on-screen PoI 200.1. No restriction is attached to the size of the circular zone 201.1 according to the invention.

As shown on FIG. 2b, when several PoIs are located near to each other, their zones may overlap each other.

Figure 2C:
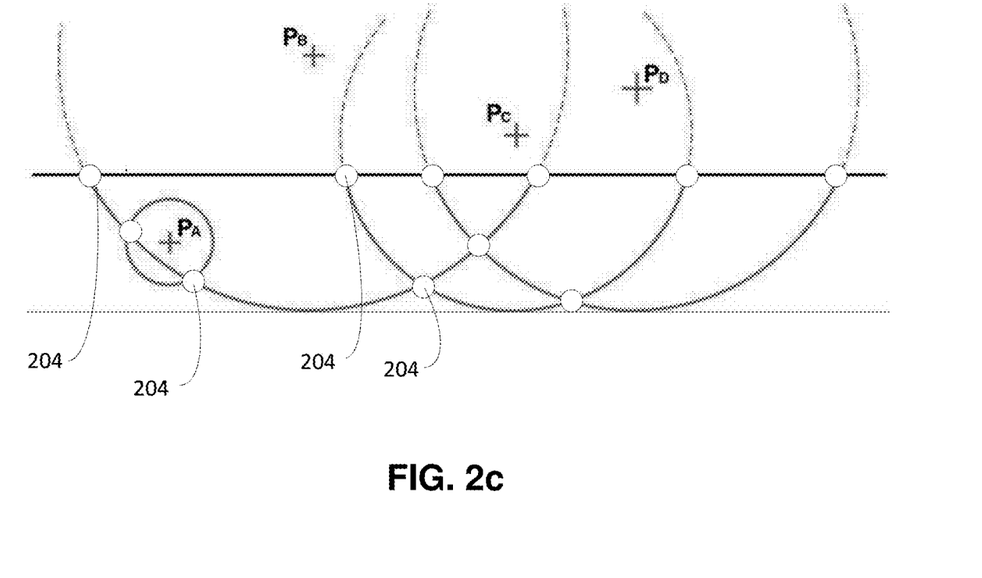

Referring to FIG. 2c, intersections between the edges of the four zones 201.1 and 201.4, and between the edges of the four zones and the screen, are referenced 204.

Figure 2D:
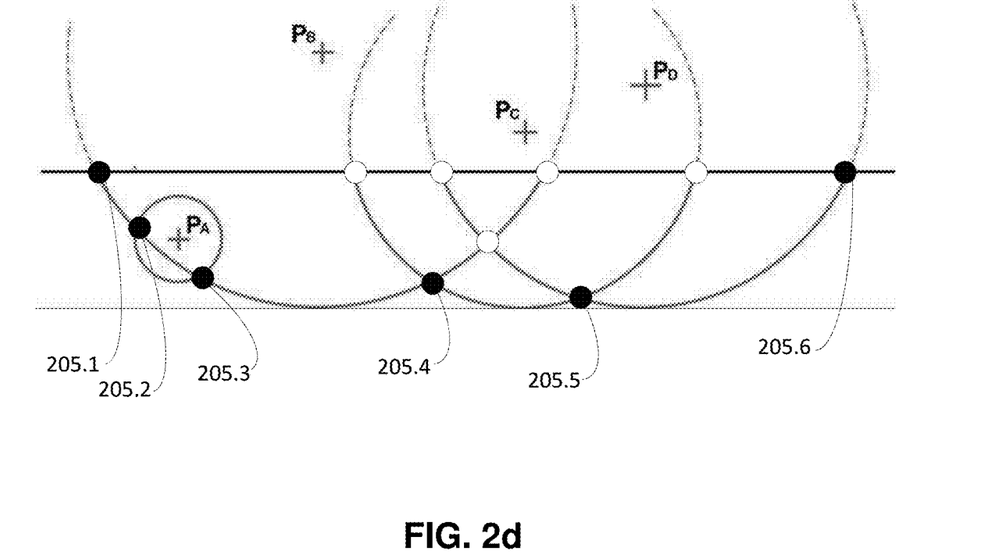

Referring to FIG. 2d, the intersections that are on screen and that are apexes of the intersection between the screen and the union of the four zones are selected and may be associated with an index i, i varying between 1 and N, N being the number of on-screen apexes. We therefore obtain intersections 205.1 (index 1), 205.2, 205.3, 205.4, 205.5 and 205.6, and N is equal to 6. It is understood that FIGS. 2a to 2g are given for illustrative purpose and do not restrict the scope of the invention, which may be applied to any distribution of PoIs and to any shape of the zones 201.

Figure 2E:
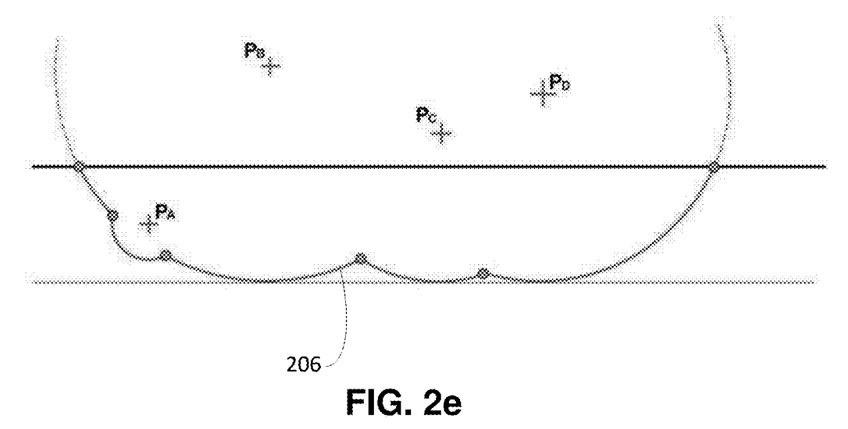

Referring to FIG. 2e, the on-screen edges of the union of the zones 201 are represented and referenced 206. According to some embodiments of the invention, the on-screen edges of the union form a continuous curve that may be superimposed with visual data acquired by a camera of the device.

The resulting continuous curve displayed on the GUI hints on location of off-screen PoIs in an aggregated manner, while retaining the information with regard to interdistances of PoIs as the edges of the union of the zones give information on the number and respective locations of off-screen PoIs. The number of edges (portions of circle) provide information regarding the number of off-screen PoIs and the curvatures of the edges provide information regarding the respective distances from the off-screen PoIs.

This makes the GUI responsive to a modification of the position/orientation of the device when handled by the user.

Therefore, the GUI hints on the location of PoI in a concise manner and adapts smoothly in accordance with the dynamic handling by the user.

In particular, a manner of dynamically adapting the way in which the GUI are displayed in order to reflect distance to off-screen PoIs while navigating towards or away from multiple off-screen PoIs on a display may be enhanced according to the invention.

In this context, "smoothly" refers to reducing abrupt transitions in the manner of adapting the GUI being displayed, and "dynamic" refers to allowing more variety in the presentation of markers (i.e. the curvature, size and number of the edges forming the resulting curve).

According to complementary embodiments that reinforce the above advantages of the invention, the continuous curve may be modified before being displayed with the visual data acquired by the camera.

To this end, for each index i, starting with i=1, the method according to some embodiments of the invention may further comprise:

calculating a quadratic curve based on the positions of the apexes of index i, i+1 and i+2 and based on the slope of the apexes of index i and i+2;

joining the apexes of indexes i and i+1 based on the quadratic curve to modify the resulting continuous curve.

This enables the modified continuous curve to have continuous slopes (compared to the original resulting continuous curve).

Figure 2F:
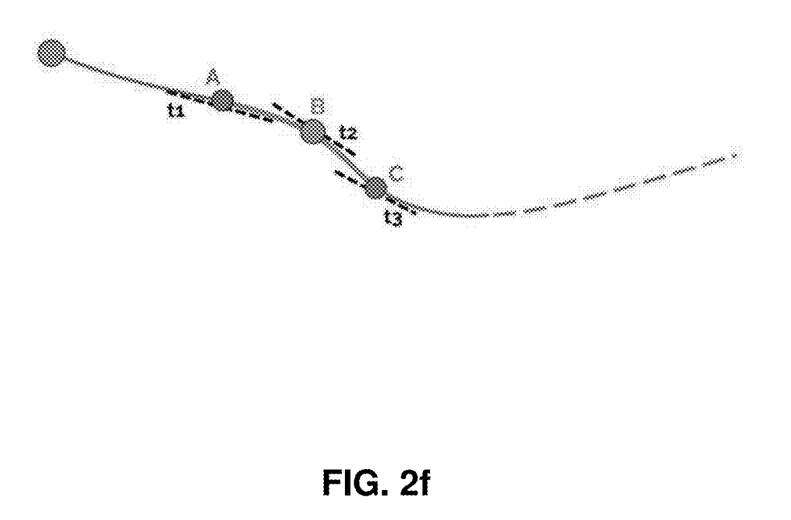

Referring to FIG. 2f, we can assume that apexes A and C are two apexes 205 having consecutive indexes. Apexes A and C have respective positions (coordinates in a coordinate system of the screen for example) and respective slopes t1 and t3, which can be determined based on the previously calculated union.

Based on the respective positions and the respective slopes, a quadratic curve joining apexes A and C can be uniquely determined, such that each point B having a position and a slope t2 belongs to the quadratic curve. The on-screen edge of the union between apexes A and C can be replaced by the quadratic curve to modify the continuous curve.

Figure 2G:
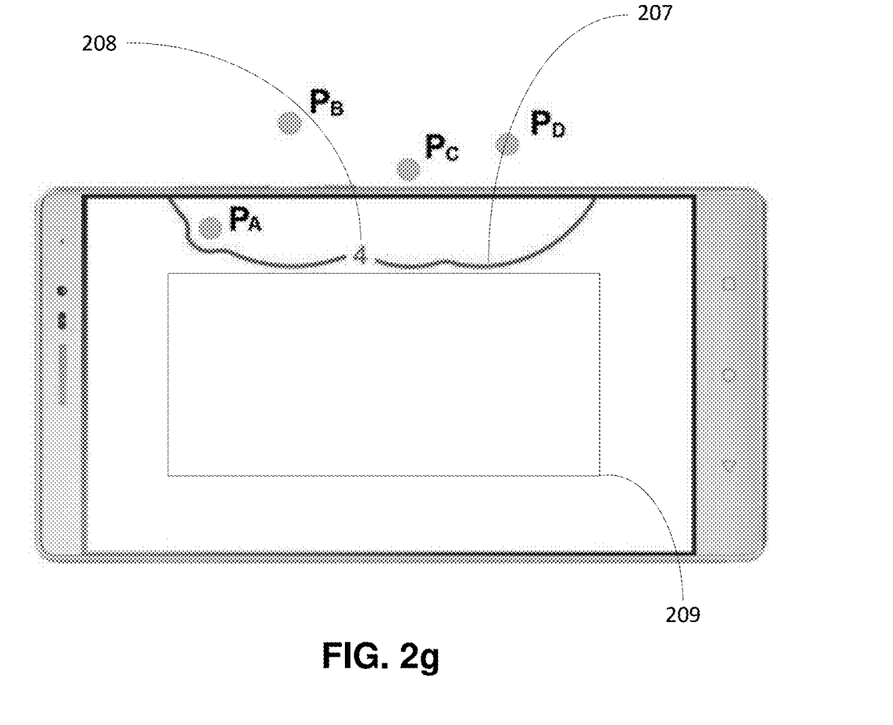

Once these calculations have been performed for all the indices, the continuous curve is modified as shown on FIG. 2g. The modified continuous curve is referenced 207.

As previously explained, the radius of the zones is such that the modified curve 207 (or the curve 206) does not penetrate a predefined rectangle 209 located in the screen. This enables to limit intrusion of the curve 206 or 207 inside the screen.

The modified continuous curve gives hints regarding interdistances between the PoIs. Indeed, if the transition between two consecutive quadratic curves at a given apex is smooth, this means that the two PoIs corresponding to the curves are distant from the other PoIs, whereas if the transition is abrupt, it means that the PoIs are close.

The continuous curve (modified or not) may also comprise a numerical information 208 being representative of the number of off-screen PoIs. For example, the numerical information 208 may be:

the total number of PoIs corresponding to the continuous curve (i.e. based on which the continuous curve has been determined), including the on-screen and off-screen PoIs; and/or the total number of off-screen PoIs corresponding to the continuous, including the on-screen and off-screen PoIs.

Figure 3:
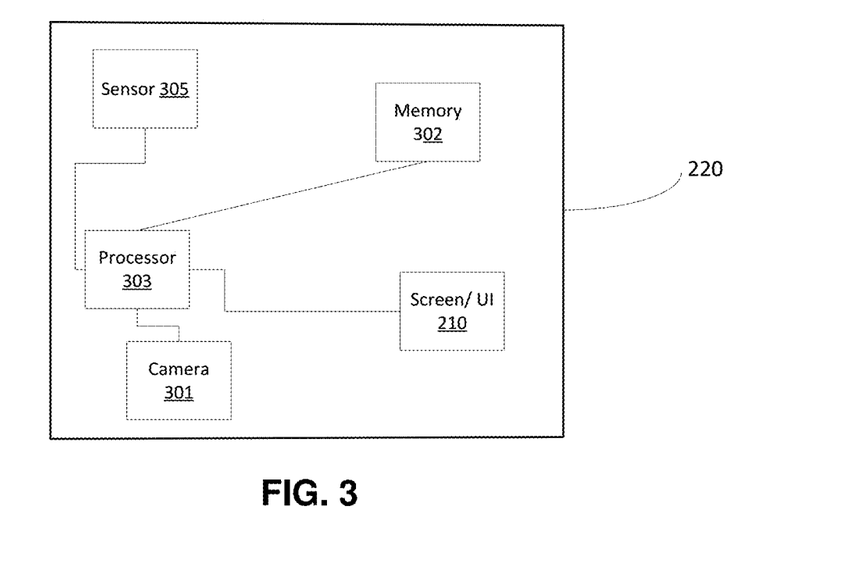
FIG. 3 shows the structure of a device according to some embodiments of the invention.

FIG. 3 shows a device 220 according to some embodiments of the invention.

The device 220 is preferably, but not exclusively, a handheld device such as a Smartphone, a touchpad, or a wearable device such as glasses for example. It may alternatively be a laptop or a desktop computer with a portable camera that can be manipulated by the user independently from the other elements of the computer.

The device 220 comprises a screen 210, which can also be a touch screen, therefore also acting as a user interface. Alternatively, in case the screen 210 is not a touch screen, the device 220 may comprise a separate user interface configured to receive a user input such as alphanumerical data or such as commands for moving a cursor.

The device 220 further comprises a processor 303, that is configured to carry out the operations of a method according to the invention as explained with reference to FIG. 3, and as illustrated on FIG. 1. The processor 303 may unidirectionally or bidirectionally communicate with a memory 302, via one or several communication buses. The memory 302 may be a Random Access Memory, RAM, a Read Only Memory, ROM, or any other type of memory such as Flash, EEPROM, etc. The memory, 302 is configured for storing, in a permanent or temporary way, at least some of the data used and/or produced by the implementation of the method according to the invention. In particular, the memory may store information related to the locations of PoIs and in particular location coordinates of PoIs (such as tridimensional coordinates). Alternatively, the location information may be stored in a remote server and the device 220 may access to the remote server via a communications network.

Alternatively, the processor 303 and memory 302 may be replaced by an electronic circuit that is dedicated to performing the operations of a method according to the invention.

The device 220 further comprises a camera 301 configured for acquiring visual data in real time. The visual data may be superimposed with the resulting curve to form the GUI. The camera 301 is preferably a main camera (i.e. a camera located on a side that is opposite to the screen) of the device 220.

The device 220 may further comprise a sensor 305, such as a sensor for locating the device 220 or for obtaining an angle of the device 220. To this end, the sensor 305 may be an accelerometer and/or a gyroscope.

Figure 4:
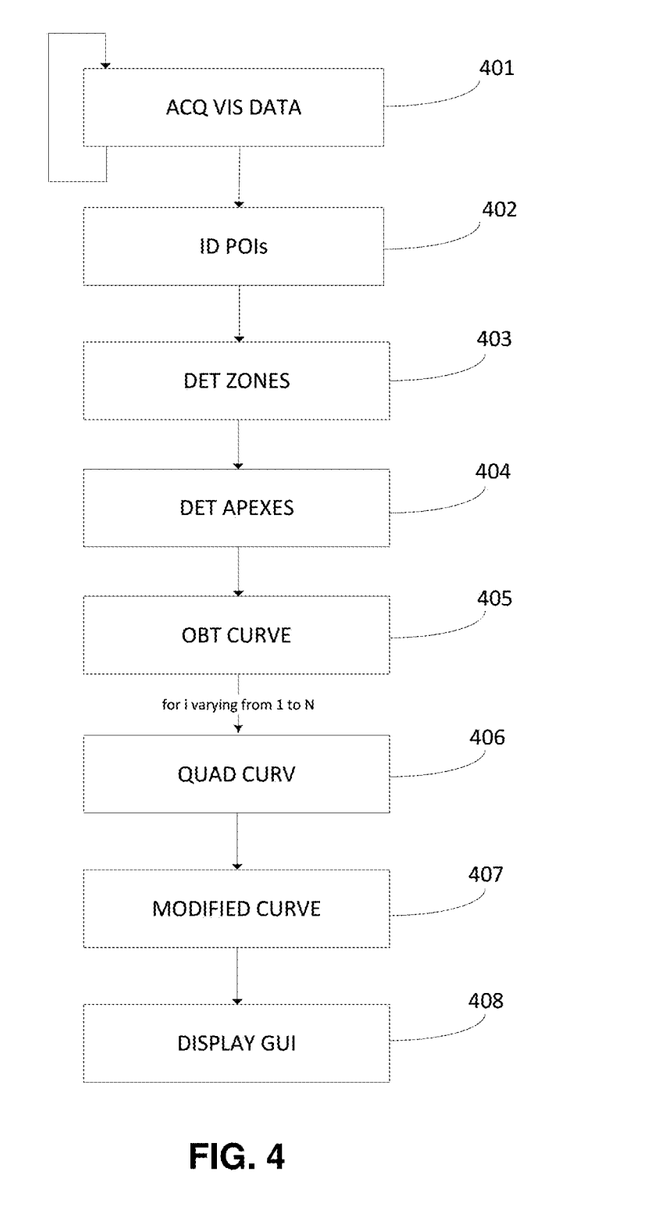
FIG. 4 is a diagram showing steps of a method according to some embodiments of the invention.

FIG. 4 is a flowchart showing the steps of a method according to some embodiments of the invention.

At step 401, visual data is acquired by the camera 301 of the device 220. Step 401 may be performed continuously so that the GUI may display the visual data in real time. To this end, visual data can be acquired at a video rate. In "real time" means that the visual data is displayed on the GUI as soon as it is acquired (of course taking into account a delay due to processing time). Alternatively, visual data can comprise static frames acquired at a given frequency (for example at least one frame per second), which is preferably high so that the GUI is responsive to manipulations of the device.

At step 402, PoIs are identified and located relatively to the device 220. No restriction is attached to the method that is used for locating the PoIs, and, in particular, well known methods may be applied. Location of the PoIs may rely on comparing a three-dimensional model that is stored in the memory 302 of the device 220, with a current location/orientation of the device. The device 220 may be located in the three-dimensional model by use of sensor data issued from the sensor 305 and/or of the visual data acquired by the camera 301, or via GPS data.

For example, some known AR technologies are called Simultaneous Localization and Mapping (SLAM) and rely on sensor data issued from a measurement unit (accelerometer, gyroscope, magnetometer) and a camera. It may involve a combination of three functions, such as depth perception, motion tracking and area learning. The device's position and orientation are tracked using IMU (Intertial Measurement Unit). Other AR technologies may rely on a single camera and sensor tracking or on GPS-based tracking.

At step 403, for each detected off-screen PoI, the method comprises determining a zone of a predetermined shape centered on the PoI, the zone being at least partly located on-screen, for example as illustrated on FIG. 2b. The predetermined shape may be a circle or more generally an ellipse for example. "Centered on" means that the PoI is located inside of the zone such that an edge of the zone hints about the location of the PoI.

At step 404, the method comprises determining on-screen apexes corresponding to intersections of edges of the respective zones. The apexes may correspond to the apexes 206 of FIG. 2e. Determining the on-screen apexes 206 may comprise determining the union of the zones corresponding to the off-screen PoIs, and optionally of those corresponding to the on-screen PoIs.

At step 405, a continuous curve is determined based on the on-screen apexes. The curve may comprise the edges of the determined union or may be a modified continuous curve, as explained referring to FIGS. 2f and 2g. In the embodiments using a modified continuous curve, the method further comprises steps 406 and 407. Step 406 comprises determining quadratic curves for couples of apexes, that have been previously indexed from 1 to N, N being the number of on-screen apexes. Then, for each index i, a portion of the modified continuous curve between apexes of indexes i and i+1 is obtained based on the quadratic curve.

At step 407, the portions of curves are aggregated to obtain the modified continuous curve. As explained above, steps 406 and 407 are optional.

At step 408, the GUI is displayed based on the on-screen apexes determined at step 404 and the visual data acquired at step 401. For example, the visual data may be superimposed with:
  on-screen edges of the union calculated at step 405; or
  the continuous curve determined at step 407.

The GUI may further comprise numerical information 208 as explained above.

The steps are then iterated and, in the next iterations, the GUI is updated based on new visual data and a new continuous curve that is determined based on a new position of the device 220.

These steps or operations are performed in real time during acquisition of the visual data by the camera to provide an AR GUI.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method of displaying an Augmented Reality, AR, Graphical User Interface, GUI, on a device, the device accessing information related to locations of Points of Interest, PoIs, comprising the following operations:
  acquiring visual data by a camera of said device;
  detecting PoIs that are located off-screen based on the visual data acquired by the camera and the information related to locations of PoIs;
  for each detected off-screen PoI, determining a zone of a predetermined shape centered on the PoI, said zone being at least partly located on-screen;
  determining on-screen apexes corresponding to intersections of edges of the respective zones;

determining a continuous curve based on the on-screen apexes;

displaying a GUI by superimposing the visual data and the continuous curve, wherein the operations are performed in real time during acquisition of the visual data.

2. The method according to claim 1, wherein indexes i are attributed to apexes in a consecutive manner, i varying between 1 and n, n being the number of apexes;

wherein each apex of index i is associated with a given position and a slope determined based on the union;

wherein for each index i, starting with i=1, the method further comprises:

determining a quadratic curve based on the positions of the apexes of index i, i+1 and i+2 and based on the slope of the apexes of index i and i+2;

joining the apexes of indexes i and i+1 based on the quadratic curve to obtain a portion of curve;

aggregating the portions of curve to obtain the continuous curve.

3. The method according to claim 1, wherein the method further comprises:

acquiring new visual data by the camera of the device;

updating the continuous curve based on new visual data; and updating the GUI by superimposing the updated continuous curve and the new visual data.

4. The method according to claim 1, wherein the on-screen apexes further comprise intersections between the screen and a union of the zones.

5. The method according to claim 1, wherein a size of each zone depends on a distance between the PoI and the screen or between the PoI and the device.

6. The method according to claim 5, wherein the distance between a given PoI and the screen is a distance between the given PoI and the nearest edge of a rectangle inside the screen, and wherein the zone is circular and the radius of the circle is equal to the distance.

7. The method according to claim 1, wherein the GUI further comprises a numerical information representative of the number of off-screen PoIs corresponding to the continuous curve.

8. A non-transitory computer readable storage medium, with a computer program stored thereon, said computer program comprising instructions for, when executed by a processor, carrying out the steps of a method according to claim 1.

9. A device comprising a screen configured for displaying an Augmented Reality, AR, Graphical User Interface, GUI, the device being configured for accessing to information related to the locations of Points of Interest, PoIs, the device further comprising:

a camera configured for acquiring visual data;

a processor configured for detecting PoIs that are located off-screen based on the visual data acquired by the camera and the information related to the locations of PoIs;

for each detected off-screen PoI, determining a zone of a predetermined shape centered on the PoI, said zone being at least partly located on-screen;

determining on-screen apexes corresponding to intersections of edges of the respective zones;

determining a continuous curve based on the on-screen apexes;

displaying a GUI on the screen by superimposing the visual data and the continuous curve, wherein the operations are performed in real time during acquisition of the visual data.

* * * * *